(12) United States Patent
De Bree

(10) Patent No.: US 8,056,645 B2
(45) Date of Patent: Nov. 15, 2011

(54) SOIL AERATION DEVICE

(75) Inventor: Cornelis Hermanus Maria De Bree, Nd Driebergen (NL)

(73) Assignee: Redexim Handel-En Exploitatie Maatschappij B.V. (NL)

( * ) Notice: Subject to any disclaimer, the term of this patent is extended or adjusted under 35 U.S.C. 154(b) by 0 days.

(21) Appl. No.: 12/747,092

(22) PCT Filed: Dec. 10, 2008

(86) PCT No.: PCT/EP2008/067256
§ 371 (c)(1),
(2), (4) Date: Jun. 9, 2010

(87) PCT Pub. No.: WO2009/074620
PCT Pub. Date: Jun. 18, 2009

(65) Prior Publication Data
US 2010/0307777 A1    Dec. 9, 2010

(30) Foreign Application Priority Data

Dec. 13, 2007 (EP) .................................... 07123138

(51) Int. Cl.
*A01B 45/02*    (2006.01)
(52) U.S. Cl. ......................................................... 172/21
(58) Field of Classification Search .................... 172/21,
172/22, 40, 42, 239, 540, 541, 544, 551,
172/556, 662, 705, 710, 711, 76–78, 438,
172/247, 118; 56/256, 320.1, 320.2, 255,
56/295; 111/135, 137
See application file for complete search history.

(56) References Cited

U.S. PATENT DOCUMENTS

| 3,802,513 | A |   | 4/1974  | Ploenges              |        |
|-----------|---|---|---------|-----------------------|--------|
| 4,424,868 | A | * | 1/1984  | Staniforth et al.     | 172/21 |
| 4,550,783 | A | * | 11/1985 | Hansen                | 172/21 |
| 4,840,232 | A | * | 6/1989  | Mayer                 | 172/21 |
| 4,867,244 | A | * | 9/1989  | Cozine et al.         | 172/22 |
| 5,623,996 | A | * | 4/1997  | Postema               | 172/118|

FOREIGN PATENT DOCUMENTS

EP    0 195 103 A    9/1986
EP    1 210 853 A    6/2002

OTHER PUBLICATIONS

International Search Report dated Mar. 20, 2009 to corresponding international patent application No. PCT/EP2008/067256, 2 pages.

* cited by examiner

*Primary Examiner* — Robert Pezzuto
(74) *Attorney, Agent, or Firm* — Maier & Maier, PLLC

(57) ABSTRACT

In a self-propelled soil aeration device comprising a machine frame, a plurality of movable piercing tools arranged next to each other transversely to the direction of travel and define a width of a working path, at least two rear wheels running laterally alongside the path, and at least one front wheel arranged in front of the piercing tools providing a supporting device extending transversely to the direction of travel and arranged in front of the piercing tools and is vertically adjustable with respect to the soil such that in a working position, the rear wheels are raised and the machine frame is supported on the supporting device and the at least one front wheel so that neither the front or rear wheels, nor the supporting device travel over the already worked soil and the supporting device is supported by one or more wheels.

12 Claims, 7 Drawing Sheets

SOIL AERATION DEVICE

RELATED APPLICATIONS

This application is the U.S. national stage application which claims priority under 35 U.S.C. §371 to international patent application No. PCT/EP2008/067256, filed on Dec. 10, 2008, which claims priority under 35 U.S.C. §119, to European patent application No. 07123138.5, filed on Dec. 13, 2007, the disclosures of which are incorporated by reference herein their entireties.

BACKGROUND

The invention refers to a soil aeration device.

Such previously known soil aeration devices comprise a machine frame, a plurality of upwardly and downwardly movable piercing tools, two rear wheels and at least one front wheel. Generally, a plurality of piercing tools arranged side by side are situated behind the front wheel, seen in the direction of travel. The piercing tools define the width of the working path on the soil. The rear wheels travel laterally beside the working path.

It is a drawback of the soil aeration devices previously known that the rear wheels are arranges laterally beside the working width. Thus, when working a soil surface, such as a lawn surface, for instance, the rear wheel travel over soil already worked. The piercing tools of the soil aeration device dig out some earth material when working the soil. This earth material is left on the soil already worked. When, upon working an adjacent path, the rear wheels travel over the soil already worked, the earth material dug out is pressed flat on the soil surface and pressed back into the holes dug, whereby the soil surface already worked is soiled to a substantial degree and a subsequent sweeping of the soil surface is impeded by earth material clinging thereto.

Therefore, it is an object of the invention to improve a soil aeration device of the type described above, wherein the disadvantages mentioned before no longer materialize when a soil surface is worked.

This object is achieved with the features of claim 1.

SUMMARY

The invention advantageously provides that a soil aeration device of the type described above comprises at least one supporting device extending transversely to the direction of travel, the supporting device being arranged in front of the piercing tools, seen in the direction of travel, and being vertically adjustable with respect to the soil such that, in a working position, the rear wheels are lifted and the machine frame is supported on the supporting device and the at least one front wheel, so that neither the front wheels or the rear wheels, nor the supporting device travel over the soil already worked by the piercing tools, and that, in a transport position, the supporting device is lifted and the machine frame is carried by the rear wheels and the at least one front wheel. The total width of the supporting device at most corresponds to the width of a working path.

This has the advantage that neither the front wheels or the rear wheels, nor the supporting device of the soil aeration device, when they are in the working position, travel over soil already worked.

It is an additional advantage that, in the transport position, the machine frame is still supported on the rear wheels and the front wheel. The rear wheels are arranged laterally beside the working width. This reduces the risk of the soil aeration device's falling over on uneven ground.

The supporting device may be arranged centrally and transversely to the direction of travel with respect to the working width.

The supporting device may be formed by at least one roll, as an alternative, it could also be at least one supporting roller or at least one skid.

The at least one supporting roller or roll may have a profile on the shell surface. This may be formed by cams, for instance. In this manner, the supporting roll or roller has a better grip even on wet ground.

The at least one supporting roller or the roll may be supported in an adjustable frame for rotation about at least one axis of rotation. The axis of rotation is parallel to the soil and preferably orthogonal to the direction of travel. The adjustable frame itself is arranged at the machine frame for pivotal movement about at least one pivot axis. The pivot axis is parallel to the soil and preferably orthogonal to the direction of travel. Using an adjustment means, the adjustable frame with the supporting device can be pivoted about the pivot axis such that the height of the supporting device can be adjusted.

The supporting device may be hollow. For instance, the supporting device may be made of a light material such as aluminum, titanium or an alloy of the aforesaid metals or other metals.

This has the advantage that the supporting device is of light weight and the weight load on the soil to be worked can be kept low.

The supporting device may be polymer-coated. The polymer may be vulcanized rubber.

The supporting device may be adapted to be vertically adjustable by means of an adjusting means, which adjusting means may be driven hydraulically, mechanically or electrically.

Using the adjusting means, the supporting device and the piercing tools may be vertically adjustable simultaneously, such that, in the working position, the machine frame is supported on the supporting device and the at least one front wheel and that, simultaneously, the piercing tools can be inserted into and pulled out from the soil.

A plurality of supporting devices can be arranged side by side transversely to the direction of travel.

The plurality of side-by-side supporting rollers or rolls could be supported separately. This is advantageous in that the supporting rollers or rolls can have different angular speeds, whereby curves can be travelled better.

In another embodiment, the supporting device may be pivotable about a vertical pivot axis. In a further embodiment, a plurality of elements of the supporting device may be pivotable about a vertical pivot axis, respectively. As an alternative, a set of several elements of the supporting device, arranged side by side, may be pivotable about a vertical pivot axis, respectively.

The following is a detailed description of embodiments of the invention with reference to the drawings. The Figures schematically show:

BRIEF DESCRIPTION OF THE DRAWINGS

FIGS. 1a and 1b illustrate a self-propelled soil aeration device 1. The soil aeration device 1 comprises a machine frame 18, a plurality of upwardly and downwardly movable piercing tools 2, at least two rear wheels 6, at least one front wheel 5 and a supporting device. The front wheel 5 of the soil aeration device 1 is propelled by a drive not illustrated, preferably an internal combustion engine. The supporting device is formed by a roll 4 and is vertically adjustable with respect to the ground 3 using an adjusting means 8. The adjusting means 8 comprises an adjusting frame 16. A hydraulic cylinder 10 is supported at the adjusting frame 16 for pivotal movement about a pivot axis 28 extending parallel to the ground and preferably orthogonal to the direction of travel. On the other side, the hydraulic cylinder is supported at the machine frame 18 for pivotal movement about another pivot axis 30 extending parallel to the ground and preferably orthogonal to the direction of travel. The adjusting device is operated by means of the hydraulic cylinder 10. An adjusting cam 12 attached to the machine frame 18 is guided in an elongate hole 14 extending vertically in the adjusting frame 16. The supporting device is vertically adjustable such that, in a working position illustrated in FIG. 1a, the rear wheels 6 are lifted and the machine frame 18 is supported on the supporting device, and that, in a transport position illustrated in FIG. 1b, the supporting device is lifted and the machine frame 18 is supported by the rear wheels 6.

Figure 1A:
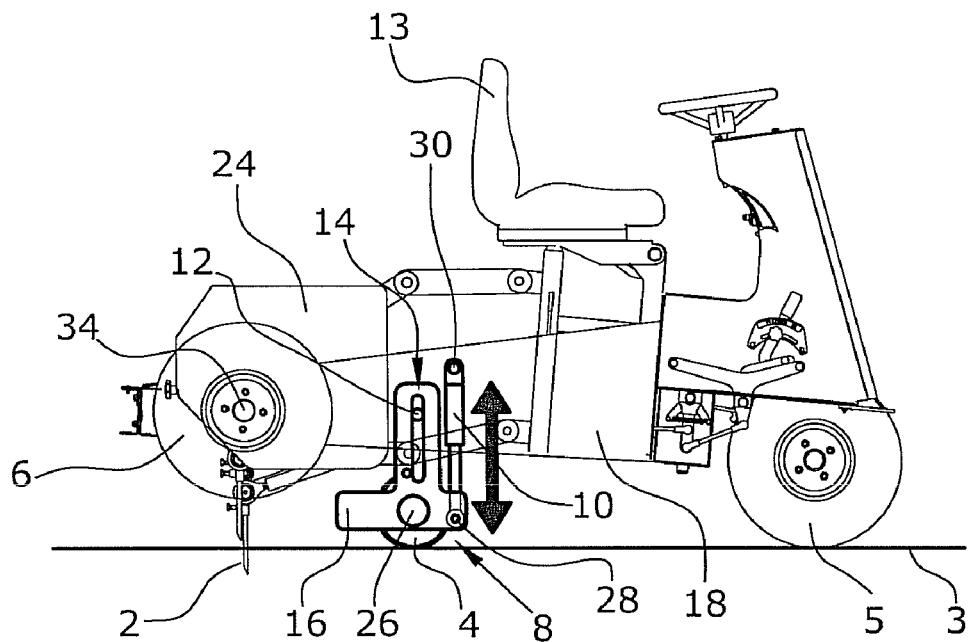
FIGS. 1a and 1b an embodiment comprising vertical height adjustment.

Moreover, the soil aeration device 1 comprises a tool frame 24 which in turn comprises a plurality of non-illustrated guiding elements arranged side by side. Respective tool holders, also not illustrated, are pivotally supported at the guide elements, each of the tool holders receiving a piercing tool 2 or a set of piercing tools 2. In the working position, illustrated in FIG. 1a, the piercing tools 2 have been pivoted by means of a pivoting means such that the piercing tools 2 can be inserted into the soil 3 and be pulled out therefrom again. Using the pivoting means, the piercing tools 2 can be raised or lowered with respect to the soil 3. The pivoting means for the piercing tools 2 and the adjusting means 8 for the supporting device can be operated independently. An upward and downward movement caused by a non-illustrated drive, preferably a camshaft drive, alternately presses the piercing tools 2 into the soil 3, which perform a tilting movement in the soil 3 due to the forward movement of the soil aeration device 1, whereby the soil 3 is broken beneath the piercing hole. In this manner the drainage capacity of the soil 3 is improved, for instance, and an optimum aeration of the soil 3 is guaranteed. Further, a healthy growth of the grasses is fostered and the application of chemical fertilizers is reduced.

Figure 1B:
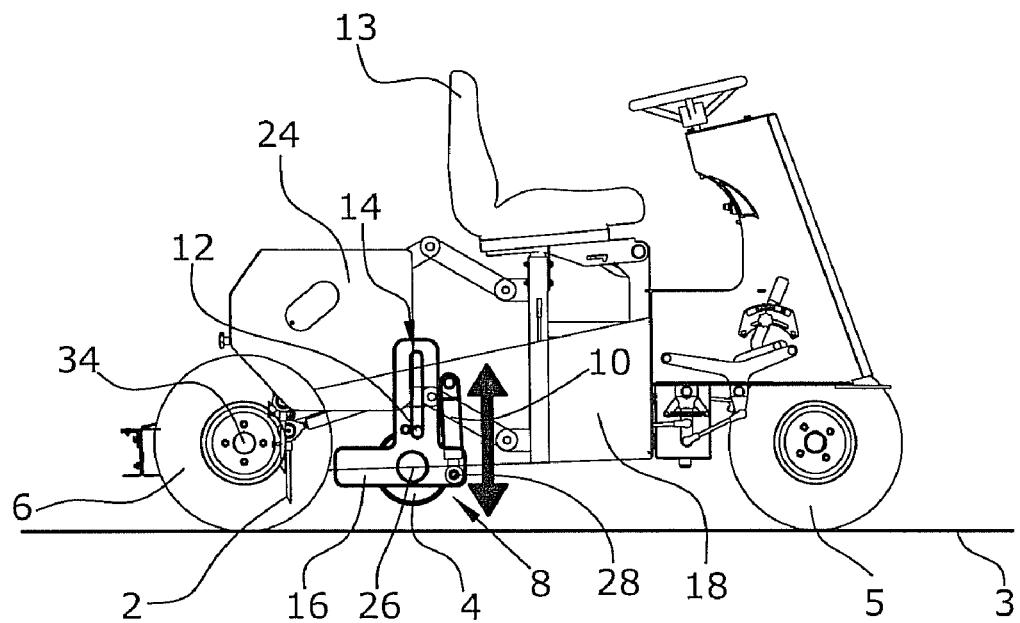

In the transport position illustrated in FIG. 1b, the piercing tools 2 have been pivoted together with the tool frame 24 by means of the pivoting means such that the piercing tools 2 neither touch the soil 3 nor are they insertable into the soil. The pivoting means and the adjusting means 8 are matched such that the piercing tools 2 can be inserted into the soil 3 only if the soil aeration device 1 is in the working position.

Figure 2A:
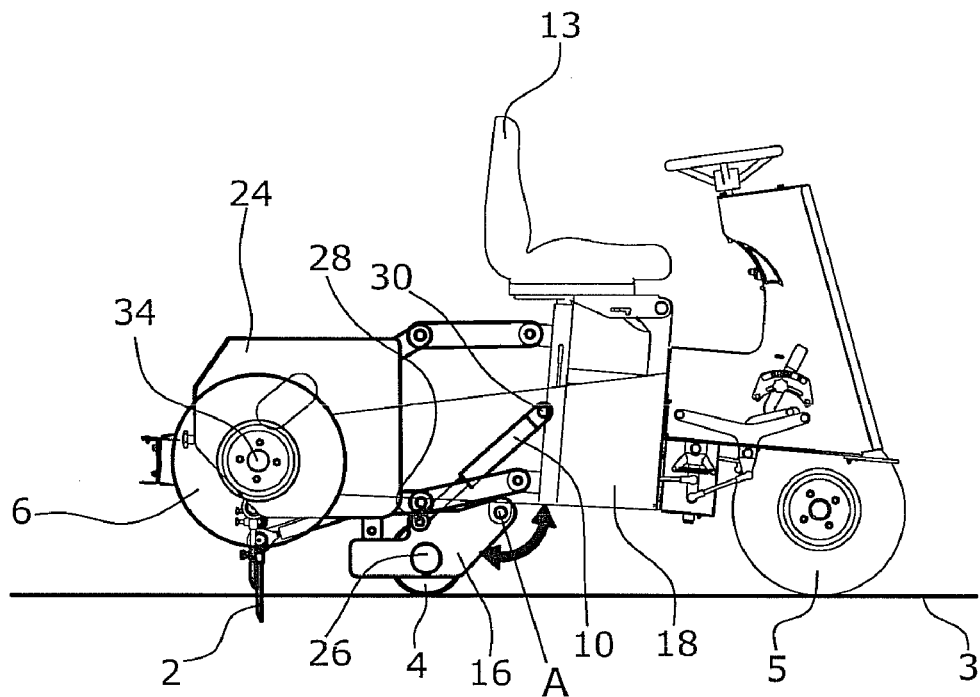
FIGS. 2a and 2b another embodiment with height adjustment.
Figure 2B:
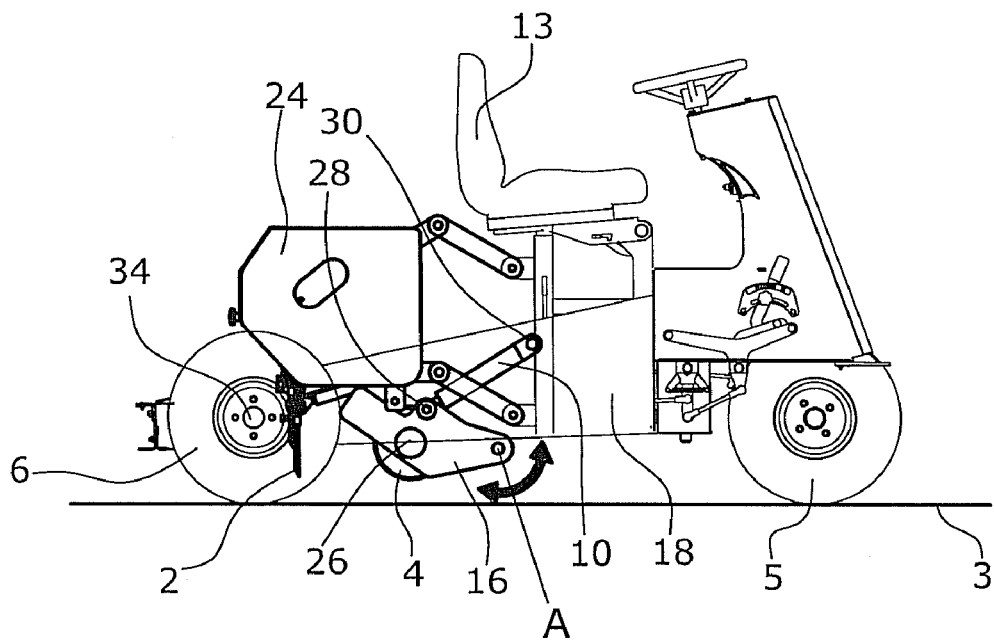

FIGS. 2a and 2b illustrate another embodiment of the present soil aeration device 1. FIG. 2a shows the soil aeration device 1 in the working position and FIG. 2b shows the same in the transport position. This embodiment differs from FIGS. 1a and 1b in that the adjusting means 8 has a different structure. The supporting device is formed by two elements arranged side by side. These elements are rolls 4. The adjusting means 8 comprises an adjusting frame 16 at which the two rolls 4 arranged side by side are supported for rotation about a rotational axis 26 that is parallel to the soil and preferably orthogonal to the direction of travel. The adjusting frame 16 is supported at the frame 18 for pivotal movement about a pivot axis A that is also parallel to the soil and preferably orthogonal to the direction of travel. At least one hydraulic cylinder 10 is supported at the adjusting frame 16 for pivotal movement about a pivot axis 28. The other side of the hydraulic cylinder 10 is supported at the machine frame 18 for pivotal movement about another pivot axis 30. The two pivot axes 28, 30 also extend parallel to the soil and preferably orthogonally to the direction of travel. The adjusting frame 16 is adapted to be pivoted about the pivot axis A by means of the hydraulic cylinder 10 such that in a working position, see FIG. 2a, the machine frame 18 is supported on the rolls 4 and the front wheel 5 and that in a transport position, see FIG. 2b, the rolls 4 are raised and the machine frame 18 is supported by the rear wheels 6 and the front wheel 5. The pivoting means of the piercing tools 2 is coupled with the adjusting means 8. They are coupled such that the piercing tools can be inserted into the soil 3 only in the working position.

Figure 3A:
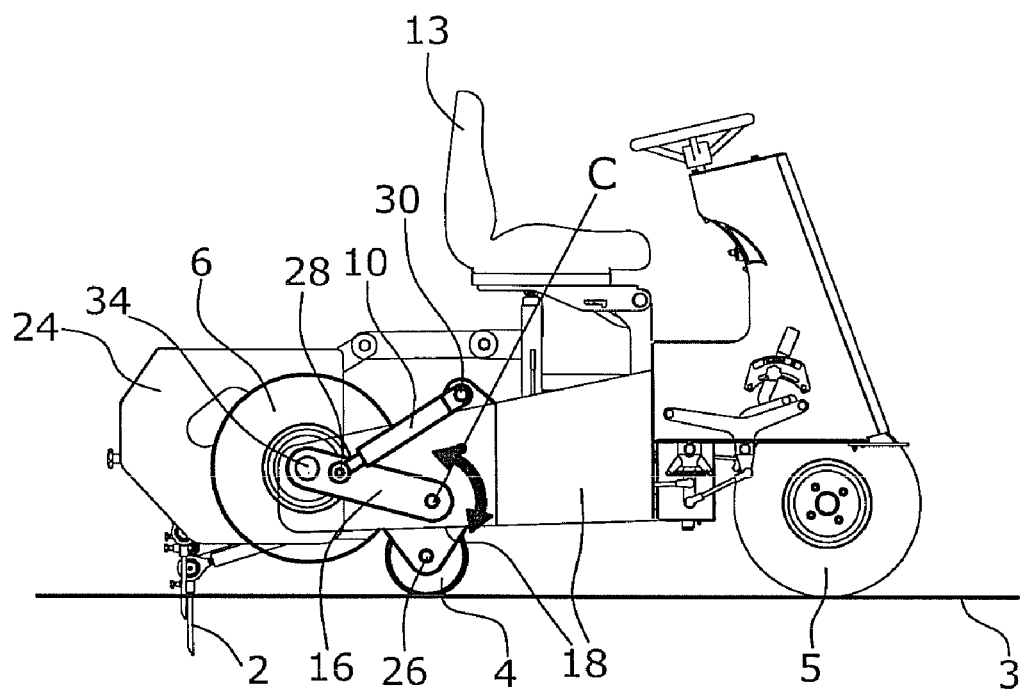
FIGS. 3a and 3b a third embodiment of a height adjustment.
Figure 3B:
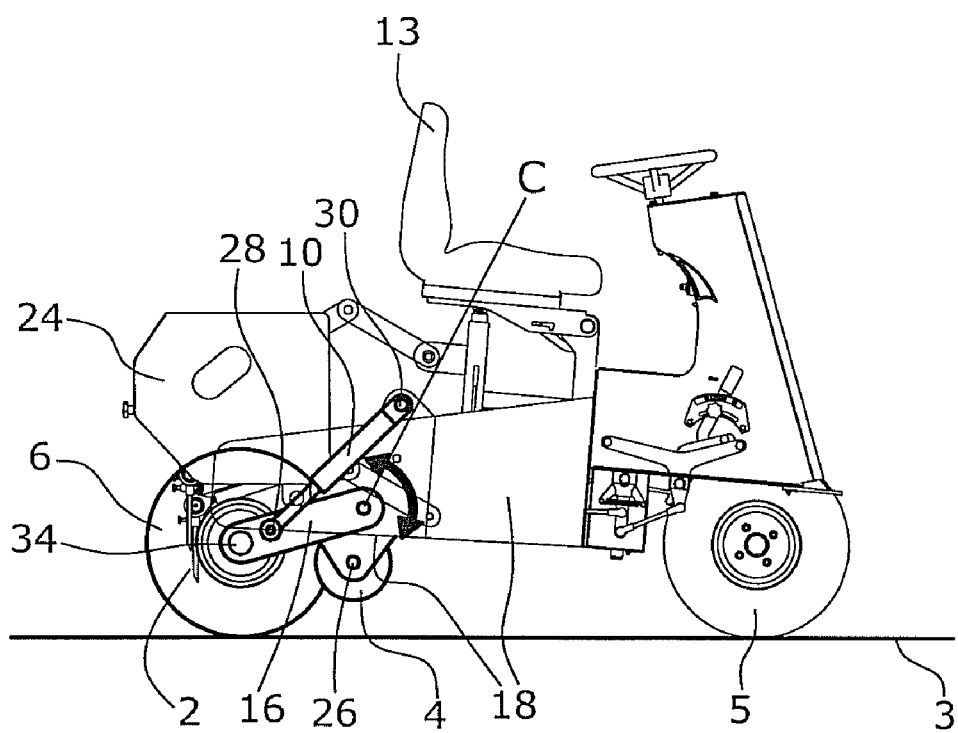

FIGS. 3a and 3b illustrate another embodiment comprising another adjusting means 8. Two rolls 4 arranged side by side are supported at the machine frame 18 for rotation about a rotational axis 26 that is parallel to the soil and preferably orthogonal to the direction of travel. The adjusting frame 16 of the adjusting means 8 is supported at the frame 18 for pivotal movement about a pivot axis C that is also parallel to the soil and preferably orthogonal to the direction of travel. The hydraulic cylinder in is supported at the adjusting frame 16 for pivotal movement about a pivot axis 28. On the other side, the hydraulic cylinder 10 is supported at the machine frame 18 for pivotal movement about another pivot axis 30. The pivot axes 28, 30 also extend parallel to the soil and preferably orthogonally to the direction of travel. The rear wheels 6 are supported at the adjusting frame 16 for rotation about an axis of rotation 34 that is parallel to the soil and preferably orthogonal to the direction of travel. When the hydraulic cylinder 10 is actuated, the rear wheels 6 are pivoted about the pivot axis C so that the rear wheels 6 are lifted with respect to the soil 3 and the rolls 4 are lowered with respect to the soil. In the working position in FIG. 3a, the machine frame 18 is supported on the rolls 4 and the front wheel 5.

Figure 4A:
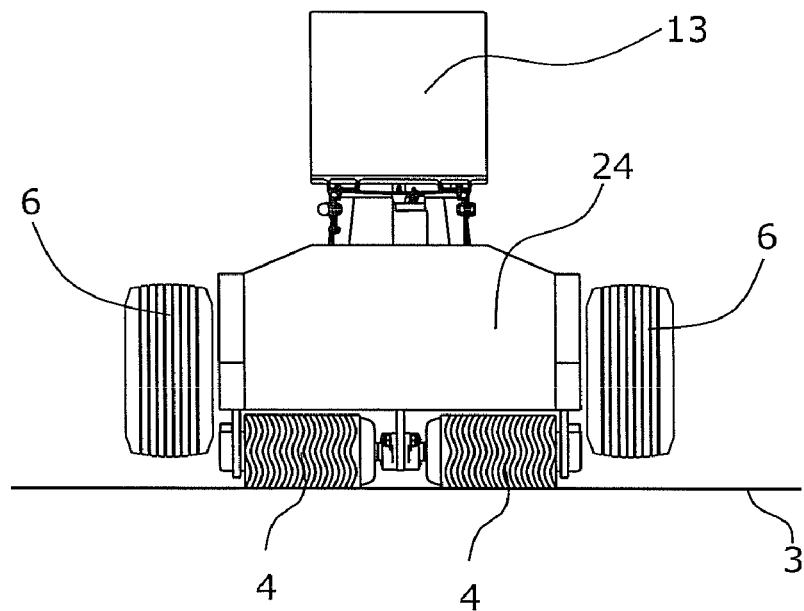
FIGS. 4a and 4b a rear view of FIGS. 3a and 3b.
Figure 4B:
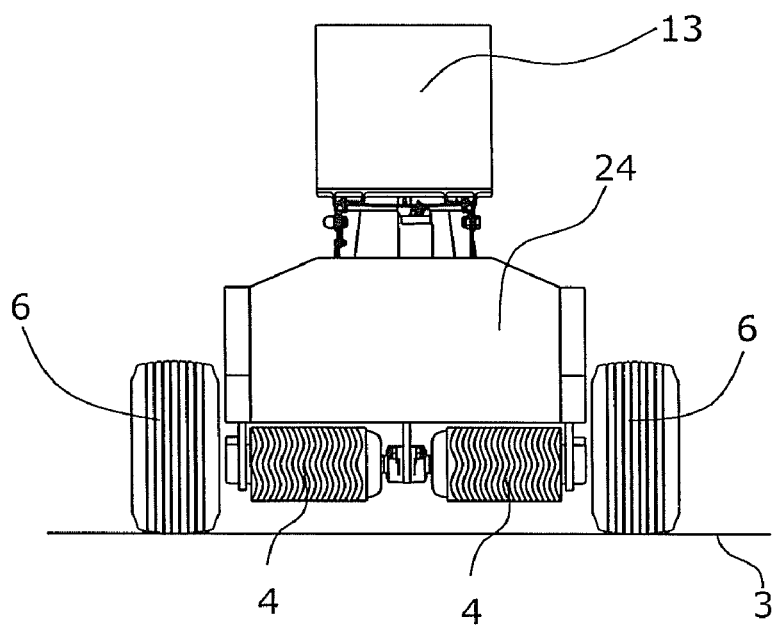

FIGS. 4a and 4b illustrate the embodiment of FIGS. 3a and 3b in rear view. FIG. 4a shows the soil aeration device 1 in the working position. The rear wheels 6 are raised and do not touch the soil 3. The machine frame 18 is supported on the rolls 4. The rolls 4 are supported separately so that the rolls 4 can have different angular speeds. This is advantageous in particular when traveling through curves. The rolls 4 are profiled. The rolls 4 can be coated with a polymer layer. This polymer layer may be a vulcanized rubber layer.

Figure 5A:
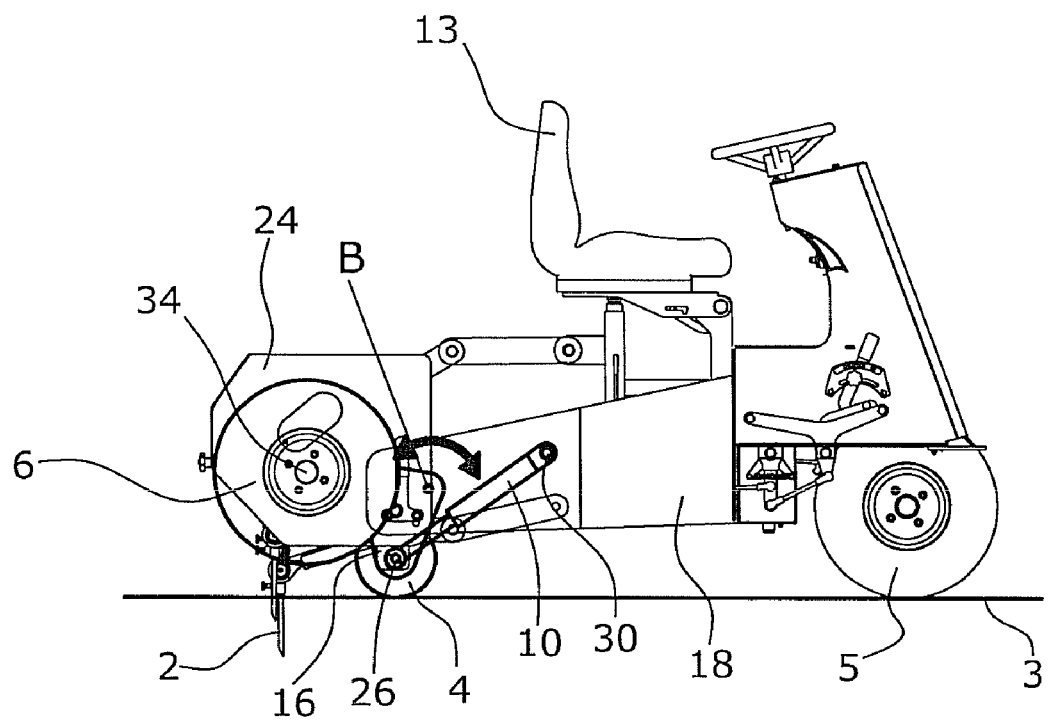
FIGS. 5a and 5b a fourth embodiment of the height adjustment.
Figure 5B:
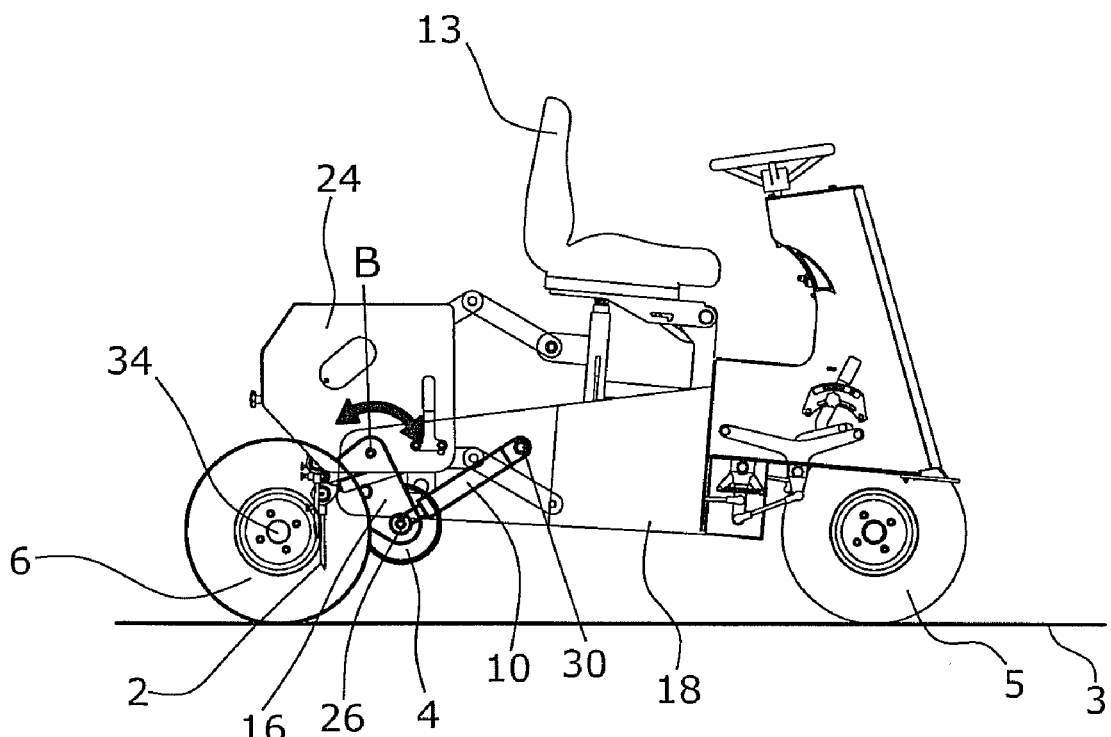

FIGS. 5a and 5b illustrate another embodiment. The rolls 4 are supported at the adjusting frame 16 for rotation about a rotational axis 26 that is parallel to the soil and preferably orthogonal to the direction of travel. The first axis of rotation 26 coincides with the pivot axis 28 about which the hydraulic cylinder 10 is pivotably supported at the adjusting frame 16. On the other side, the hydraulic cylinder 10 is supported at the machine frame 18 for pivotal movement about the fifth pivot axis 30. The pivot axes 28, 30 also extend parallel to the soil and preferably orthogonally to the direction of travel. The adjusting frame 16 is supported at the frame 18 for pivotal movement about a pivot axis B that is also parallel to the soil and preferably orthogonal to the direction of travel. The rear wheels 6 are also supported at the adjusting frame 16 for rotation about an axis of rotation 34 that is parallel to the soil and preferably orthogonal to the direction of travel. When the hydraulic cylinder 10 is actuated, the adjusting frame 16 is pivoted about the pivot axis R. Thereby, the rear wheels 6 and the rolls 4 are pivoted about the pivot axis B at the same time. Thus, one can switch between the working position illustrated in FIG. 5a and the transport position illustrated in FIG. 5b.

Figure 6:
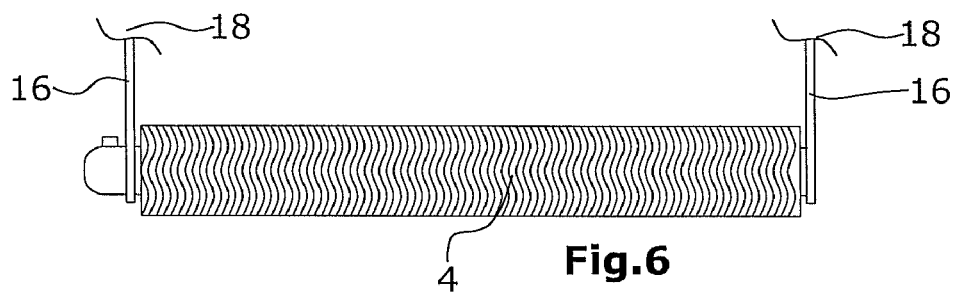
FIG. 6 a roll as the supporting device.

FIG. 6 to FIG. 12 illustrate different embodiments of the roll 4 or the rolls 4. The various embodiments of the rolls 4 can be combined with the various embodiments of the adjusting means 8 illustrated in FIGS. 1a, 1b to 5a, 5b. FIG. 6 illustrates a roll 4 that is supported at the adjusting frame 16 for rotation about an axis of rotation 26 that is parallel to the soil and preferably orthogonal to the direction of travel. The roll 4 has a profile on the shell surface for the roll 4 to have a better grip on the soil and not to slip.

Due to a corresponding resilient support, the rolls 4 arranged side by side in the embodiments illustrated in FIGS. 6 to 12, can be movable independently in the vertical direction and/or in the direction of travel and/or may be independently pivotable about a vertical axis. Thus, the rolls can adapt optimally to an uneven soil surface.

Figure 7:
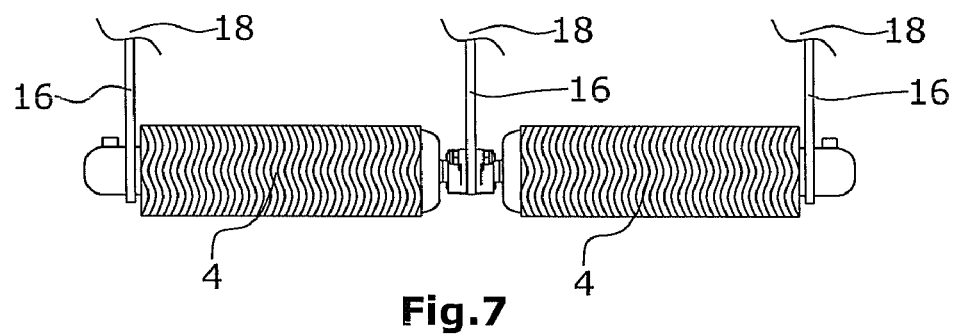
FIG. 7 two rolls arranged side by side.

FIG. 7 illustrates two rolls 4 arranged side by side also supported at the adjusting frame 16' for rotation about an axis of rotation 26 that is parallel to the soil and preferably orthogonal to the direction of travel. The rolls 4 are supported independently so that they can have different angular speeds. This is advantageous in particular when negotiating curves.

Figure 8:
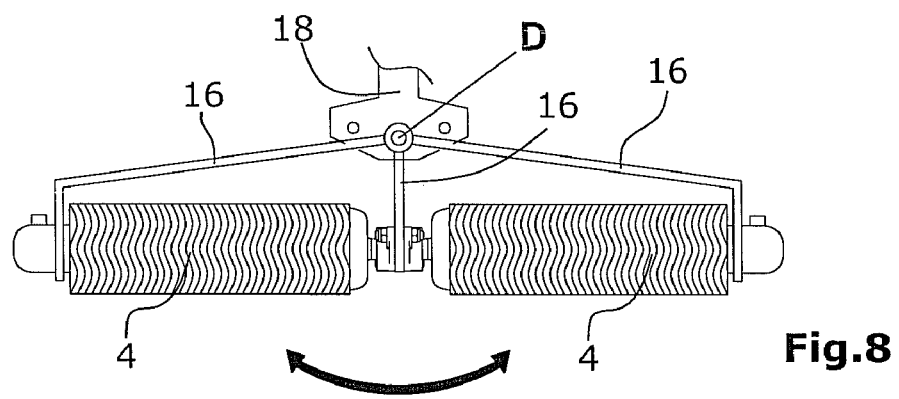
FIG. 8 two rolls arranged side by side which are pivotable about a vertical axis, FIG. 9 two rolls arranged side by side which are separately pivotable about a respective vertical axis, FIG. 10 a plurality of rolls arranged side by side, FIG. 11 a plurality of rolls arranged side by side which are pivotable about a vertical axis, FIG. 12 two sets of rolls, arranged side by side, which are pivotable about a respective vertical axis.

FIG. 8 illustrates two rolls 4 arranged side by side also supported at the adjusting frame 16 for rotation about an axis of rotation 26 that is parallel to the soil and preferably orthogonal to the direction of travel. The adjusting frame 16 is supported for pivotal movement about a vertical sixth pivot axis D. Thus, the rolls 4 can better follow the path of a curve when negotiating a curve.

Figure 9:
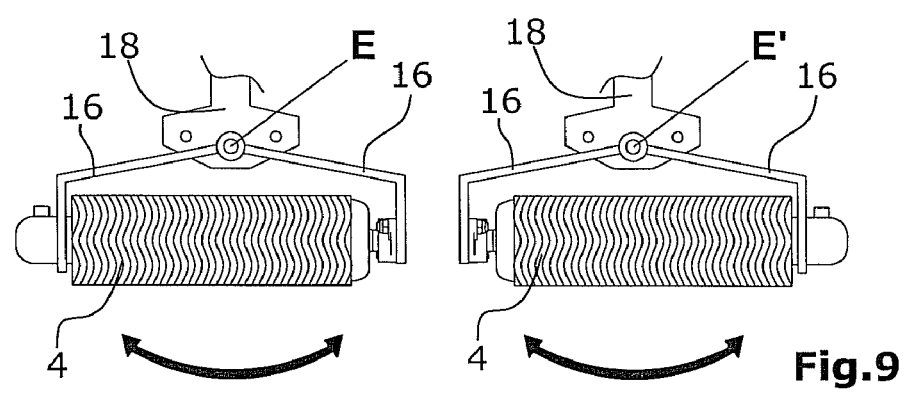

In FIG. 9, two rolls 4 arranged side by side are each supported for pivotal movement about a vertical pivot axis E, E'.

Figure 10:
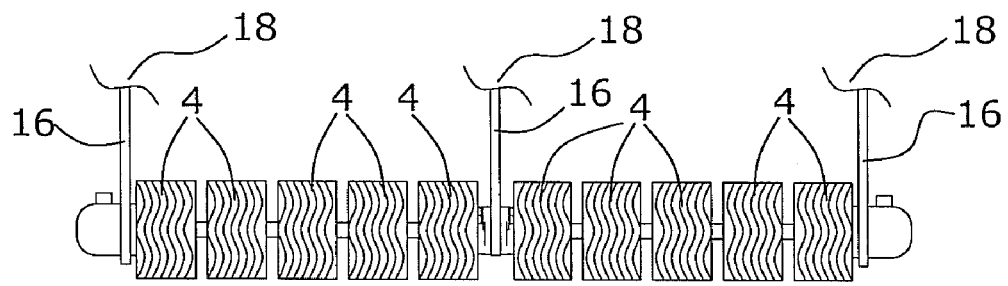

In FIG. 10, a plurality of rolls 4 are supported at the adjusting frame 16 for rotation about a first axis of rotation 26 that is parallel to the soil. The rolls are supported separately so that the same can have different angular speeds, which is advantageous when traveling curves.

Figure 11:
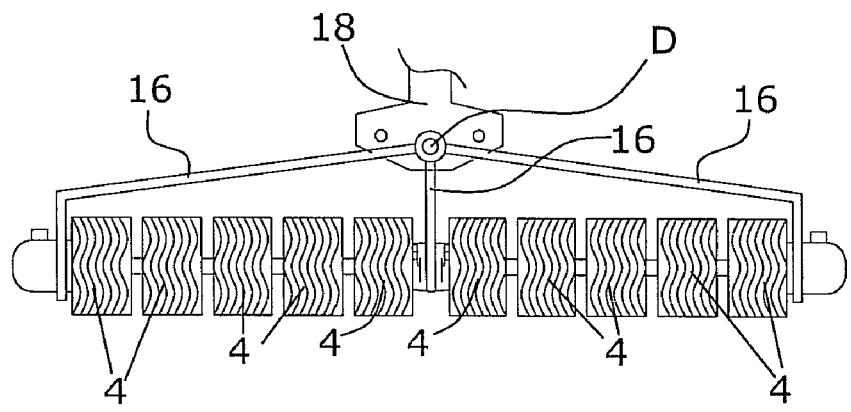

FIG. 11 is a combination of the embodiment in FIG. 10 and the one in FIG. 8. A plurality of rolls 4 arranged side by side are supported at an adjusting frame 16 for rotation about an axis of rotation that is parallel to the soil, the adjusting frame in turn being supported at the machine frame 18 for pivotal movement about a vertical pivot axis D.

Figure 12:
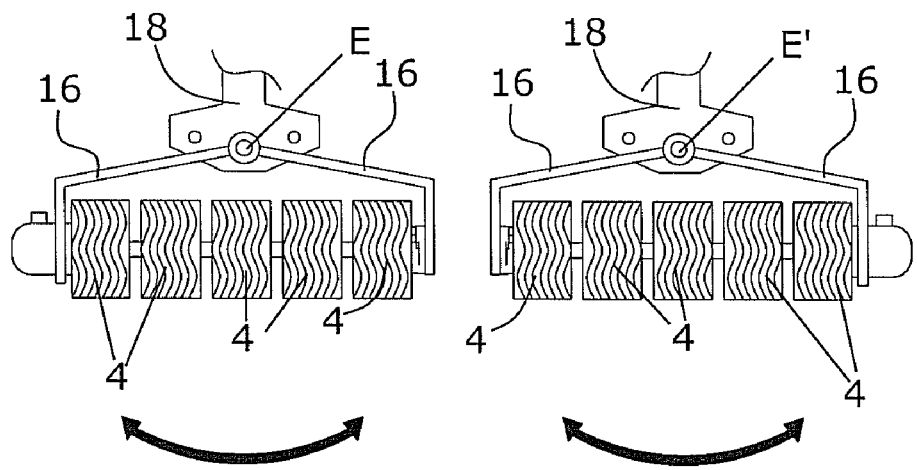

FIG. 12 illustrates a combination of the embodiment in FIG. 10 and the one in FIG. 9. Two sets of rolls 4 arranged side by side are arranged next to each other and are each supported at an adjusting frame 16 for rotation about an axis of rotation parallel to the soil, the adjusting frame itself being supported at the machine frame 18 for pivotal movement about a vertical pivot axis E, E', respectively.

The invention claimed is:

1. A self-propelled soil aeration device comprising:
a machine frame,
a plurality of upwardly and downwardly movable piercing tools which are arranged next to each other transversely to a direction of travel and which define a width of a working path on the soil,
at least two rear wheels which run laterally alongside the working path, and
at least one front wheel which is arranged in front of the piercing tools as seen in the direction of travel, wherein,
a supporting device extending transversely to the direction of travel is arranged in front of the piercing tools, as seen in the direction of travel, and is vertically adjustable with respect to the soil such that in a working position, the rear wheels are raised and the machine frame is supported on the supporting device and the at least one front wheel so that neither the front or rear wheels, nor the supporting device travel over the soil already worked by the piercing tools, and that in a transport position, the supporting device is raised and the machine frame is supported by the rear wheels and the at least one front wheel, wherein
in a working position the supporting device and at least one front wheel are in direct contact with the soil.

2. The soil aeration device of claim 1, wherein the total width of the supporting device corresponds at most to the width of the working path of the piercing tools.

3. The soil aeration device of claim 1, wherein the supporting device is arranged centrally and transversely to the direction of travel with respect to the working width.

4. The soil aeration device of claim 1, wherein the supporting device is formed by at least one roll.

5. The soil aeration device of claim 1, wherein the supporting device is formed by at least one supporting roller.

6. The soil aeration device of claim 4, wherein the supporting device has cams on a shell surface.

7. The soil aeration device of claim 4, wherein the supporting device is supported at an adjusting frame for rotation about at least one rotational axis that is parallel to the soil and orthogonal to the direction of travel, said adjusting frame itself also being supported at the machine frame for pivotal movement about at least one pivot axis that is parallel to the soil and orthogonal to the direction of travel, said adjusting frame, together with the supporting device, being pivotable about said pivot axis by means of an adjusting means such that the height of the supporting device is adjustable.

8. The soil aeration device of claim 1, wherein a plurality of elements of the supporting device are arranged side by side transversely to the direction of travel.

9. The soil aeration device of claim 1, wherein the supporting device or the elements of the supporting device are pivotable about a vertical pivot axis.

10. The soil aeration device of claim 8, wherein each element of the supporting device is pivotable about a respective vertical pivot axis.

11. The soil aeration device of claim 8, wherein a respective set of a plurality of supporting device elements arranged side by side is pivotable about a respective vertical axis.

12. A self-propelled soil aeration device comprising:
a machine frame,
a plurality of upwardly and downwardly movable piercing tools which are arranged next to each other transversely to a direction of travel of the device and which define a width of working path on the soil,
at least two rear wheels which run laterally alongside the working path, and at least one front wheel which is arranged in front of the piercing tools as seen in the direction of travel of the device, wherein a supporting device extending transversely to the direction of travel of the device is arranged in front of the piercing tools, as seen in the direction of travel of the device, and is vertically adjustable with respect to the soil such that in a working position, the rear wheels are raised and the machine frame is supported on the supporting device and the at least one front wheel so that neither the front or rear wheels, nor the supporting device travel over the soil already worked by the piercing tools, and that in a transport position, the supporting device is raised and the machine frame is supported by the rear wheels and the at least one front wheel, wherein in a working position the supporting device and at least one front wheel are in direct contact with the soil, wherein the supporting device is formed by at least one roll or by at least one supporting roller.

* * * * *